United States Patent
Steinmetz et al.

(10) Patent No.: US 11,977,742 B2
(45) Date of Patent: May 7, 2024

(54) SOLID STATE DRIVES CONFIGURABLE TO USE STORAGE SPACES OF REMOTE DEVICES IN ACTIVITIES INVOLVING PROOF OF SPACE

(71) Applicant: Micron Technology, Inc., Boise, ID (US)

(72) Inventors: Joseph Harold Steinmetz, Loomis, CA (US); Luca Bert, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/591,551

(22) Filed: Feb. 2, 2022

(65) Prior Publication Data

US 2023/0244386 A1 Aug. 3, 2023

(51) Int. Cl.
*G06F 12/00* (2006.01)
*G06F 3/06* (2006.01)

(52) U.S. Cl.
CPC .......... *G06F 3/0619* (2013.01); *G06F 3/0659* (2013.01); *G06F 3/067* (2013.01)

(58) Field of Classification Search
None
See application file for complete search history.

(56) References Cited

U.S. PATENT DOCUMENTS

| | | | |
|---|---|---|---|
| 8,296,380 B1 * | 10/2012 | Kelly | H04L 51/216 709/224 |
| 9,674,162 B1 | 6/2017 | Miller et al. | |
| 9,916,478 B2 | 3/2018 | Slik | |
| 10,101,931 B1 | 10/2018 | Camp et al. | |
| 10,552,058 B1 | 2/2020 | Jadon et al. | |
| 10,729,030 B1 | 7/2020 | Cousineau et al. | |
| 10,831,691 B1 | 11/2020 | Dazzi et al. | |
| 11,107,071 B2 | 8/2021 | Carlsson et al. | |
| 11,418,402 B1 | 8/2022 | Jakobsson | |
| 11,775,188 B2 | 10/2023 | Bert et al. | |
| 2006/0288034 A1 * | 12/2006 | Do | G06F 21/6218 707/999.102 |
| 2012/0246391 A1 | 9/2012 | Meir et al. | |
| 2014/0189890 A1 | 7/2014 | Koeberl et al. | |
| 2015/0254108 A1 | 9/2015 | Kurtzman et al. | |

(Continued)

OTHER PUBLICATIONS

Park, Sunoo, et al., "SpaceMint: A Cryptocurrency Based on Proofs of Space." International Conference on Financial Cryptography and Data Security, Dec. 7, 2018.

*Primary Examiner* — Daniel D Tsui
(74) *Attorney, Agent, or Firm* — Greenberg Traurig

(57) ABSTRACT

An apparatus with a solid state drive (SSD) having firmware to farm proof of space plots stored outside of the SSD. The SSD has a communication interface configured to receive at least read commands and write commands from an external host system. The SSD has memory cells formed on at least one integrated circuit die, and a processing device configured to control executions of the read commands to retrieve data from the memory cells and executions the write commands to store data into the memory cells. The firmware is executable in the SSD to receive and store configuration data specified via a user interface to indicate a location, outside of the SSD, storing a proof of space plot that can be used by the SSD to participate in proof of space activities in a cryptocurrency network.

20 Claims, 6 Drawing Sheets

(56) References Cited

U.S. PATENT DOCUMENTS

| | | |
|---|---|---|
| 2015/0363248 A1 | 12/2015 | D'abreu |
| 2016/0292672 A1 | 10/2016 | Fay et al. |
| 2016/0330627 A1* | 11/2016 | Zhang ................ G06F 21/6218 |
| 2016/0379212 A1 | 12/2016 | Bowman et al. |
| 2017/0220292 A1 | 8/2017 | Hashimoto |
| 2017/0337534 A1 | 11/2017 | Goeringer et al. |
| 2018/0007025 A1 | 1/2018 | Oberheide et al. |
| 2019/0108518 A1 | 4/2019 | Asif et al. |
| 2019/0108519 A1 | 4/2019 | Asif et al. |
| 2019/0280863 A1 | 9/2019 | Meyer et al. |
| 2019/0324995 A1 | 10/2019 | Jakobsson |
| 2019/0349185 A1 | 11/2019 | Kim et al. |
| 2019/0370012 A1 | 12/2019 | Sears et al. |
| 2019/0370069 A1 | 12/2019 | Swadling et al. |
| 2019/0379642 A1 | 12/2019 | Simons et al. |
| 2020/0133898 A1 | 4/2020 | Therene et al. |
| 2020/0134202 A1 | 4/2020 | Sapuntzakis et al. |
| 2020/0201679 A1 | 6/2020 | Wentz |
| 2020/0201683 A1 | 6/2020 | Muskal et al. |
| 2020/0210104 A1 | 7/2020 | Grosz et al. |
| 2020/0226080 A1 | 7/2020 | Tarango et al. |
| 2020/0389312 A1 | 12/2020 | Boneh et al. |
| 2021/0182423 A1 | 6/2021 | Padmanabhan |
| 2021/0271667 A1* | 9/2021 | Cohen ................ G06F 12/0223 |
| 2021/0279371 A1 | 9/2021 | Monji et al. |
| 2021/0390179 A1 | 12/2021 | Hahn et al. |
| 2022/0043937 A1 | 2/2022 | Spalding et al. |
| 2022/0083683 A1 | 3/2022 | Murck et al. |
| 2022/0116225 A1 | 4/2022 | Cohen et al. |
| 2022/0368596 A1 | 11/2022 | Jakobsson |
| 2023/0053269 A1 | 2/2023 | Yang et al. |
| 2023/0110131 A1 | 4/2023 | Smith et al. |
| 2023/0115694 A1 | 4/2023 | Cohen et al. |
| 2023/0132211 A1 | 4/2023 | Ateniese et al. |
| 2023/0139330 A1 | 5/2023 | Lee et al. |
| 2023/0185459 A1 | 6/2023 | Steinmetz et al. |
| 2023/0185476 A1 | 6/2023 | Bert et al. |
| 2023/0185482 A1 | 6/2023 | Steinmetz et al. |
| 2023/0185483 A1 | 6/2023 | Steinmetz et al. |
| 2023/0185738 A1 | 6/2023 | Steinmetz et al. |
| 2023/0186289 A1 | 6/2023 | Bert et al. |
| 2023/0188337 A1 | 6/2023 | Bert et al. |
| 2023/0188366 A1 | 6/2023 | Steinmetz et al. |
| 2023/0188599 A1 | 6/2023 | Bert et al. |
| 2023/0244393 A1 | 8/2023 | Bert et al. |
| 2023/0244394 A1 | 8/2023 | Bert et al. |

* cited by examiner

SOLID STATE DRIVES CONFIGURABLE TO USE STORAGE SPACES OF REMOTE DEVICES IN ACTIVITIES INVOLVING PROOF OF SPACE

TECHNICAL FIELD

At least some embodiments disclosed herein relate to memory systems in general, and more particularly, but not limited to memory systems configured to support proof of space activities.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
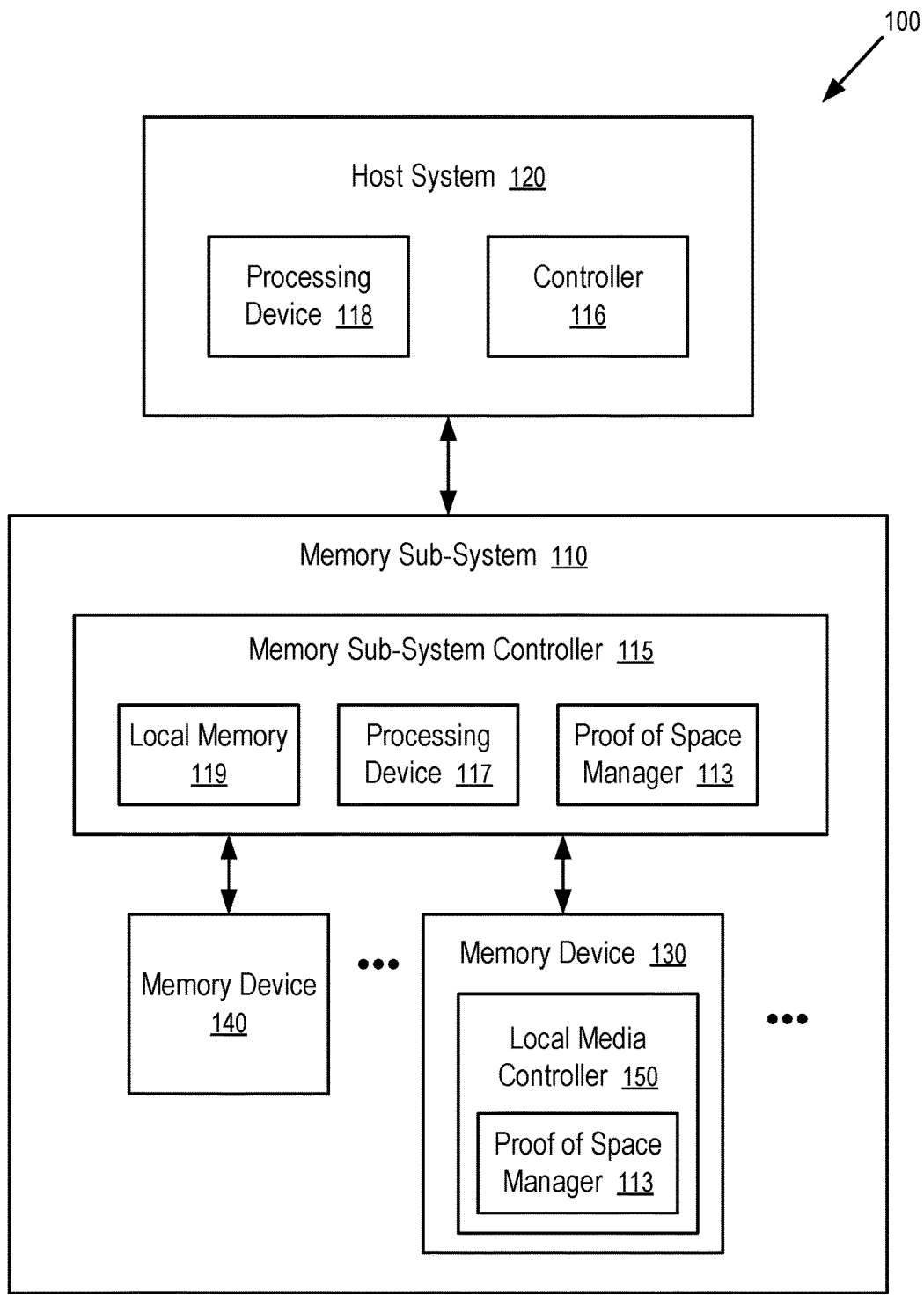
FIG. 1 illustrates an example computing system having a memory sub-system in accordance with some embodiments of the present disclosure.

At least some aspects of the present disclosure are directed to a memory sub-system configurable, via a user interface, to use remotely stored proof of space plots to participate in proof of space activities. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A conventional memory sub-system, such as a hard disk drive (HDD) or a solid state drive (SSD), can be used in activities that require the proof of data storage space. There are known types of challenge-response computations that can be implemented via a set of lookup tables. When the lookup tables are stored in the hard drive or solid state drive, a correct response to a challenge can be generated efficiently using the lookup tables with little computing power and energy consumption. Without storing the lookup tables, it can be unfeasible and/or impractical to generate the correct response on the fly within a short period of time. Thus, in response to a challenge, a correct response to the challenge, generated within a threshold period of time from the challenge, can be seen as a result of the response being generated using the lookup tables stored in a data storage device. Storing the lookup tables occupies an amount of data storage space. Thus, the correct response can be used as a proof of the possession of the amount of spare storage space that is currently used to store the lookup tables. A cryptocurrency network can use proof of space (e.g., to replace proof of work used in other cryptocurrency networks, such as Bitcoin) to improve energy efficiency of computations related to cryptocurrency activities. For example, Chia Network uses proof of space and time to replace energy intensive proof of work.

In general, a plot suitable for proof of space includes data used in challenge-response activities. Such data of a plot typically includes a set of lookup tables with numbers that appear to be random and that are generated from a small amount of initial data. For a given challenge as an input, the lookup tables of the plot can be used to generate a response with very little time and computation and thus little energy expenditure. The correctness of the response can be easily verified using the initial data without the lookup tables. However, it is very difficult and statistically impossible to generate the correct response without the lookup tables. Thus, the correct response can be used as a proof that the response is from an entity having the lookup tables and thus the storage space occupied by the plot of lookup tables. The use of plots to generate responses to proof of space challenges can be referred to as plot farming.

A conventional computer system can have a solid state drive connected to a host system. The host system can run an application to use a portion of the storage space provided in the solid state drive to store and farm a proof of space plot. Since proof of space plots are used to store proof of space lookup tables and make the storage resources unusable to a host system, an advantage is recognized in configuring the solid state drive to automatically use the lookup tables stored in the solid state drive in proof of space activities without using the computing resources of the host system.

At least some aspects of the present disclosure address the above and other deficiencies and challenges by configuring a memory sub-system, such as a solid state drive, to have a space manager that automatically participates in proof of space activities in a cryptocurrency network and/or a blockchain. Further, the memory sub-system can be configured, via a user interface of an administrative control panel, to rent, borrow, and/or use storage resources of another device to host a plot for farming. Thus, the plot generated and stored in another device can be used in farming without the need to physically transfer the large amount of data of the plot between the devices over a computer network. The automatic farming operations by the memory sub-system can relieve the host system from the burden in handling the use of proof of space plots stored in the memory sub-system and/or other devices used by the memory sub-system.

For example, an administrative control panel can be configured to set up parameters controlling the operations of a solid state drive in proof of space activities. The solid state drive is installed in a local computer; and a user of the administrative control panel can provide a permission for the solid state drive to rent an amount of storage space from a remote device to host a plot for farming.

The remote device can similarly have a solid state drive. When the solid state drive of the remote device has spare storage resources to store a proof of space plot, the solid state drive can acquire a proof of space plot. For example, the solid state drive can perform the computation to generate the plot. Alternatively, the plot can be obtained in other ways. For example, a manufacturer of solid state drives can optionally pre-store the plot in the solid state drive as part of the operations to produce the solid state drive. For example, the solid state drive can copy or transfer the plot from another storage device installed in the remote device. In some instances, the remote device has a hard disk drive having spare storage resources; and the plot generated and/or pre-stored in the solid state drive of the remote device can be transferred to the hard disk drive for renting to other devices.

For example, a user of the remote device can configure the solid state drive and/or the remote device to offer the plot for use by other solid state drives. After the administrative control panel configures the solid state drive in the local computer to use the plot in the remote device, the solid state drives in the local computer and in the remote computer can communicate with each other to generate responses to proof of space challenges. Thus, the plot generated and/or stored in the solid state drive in the remote computer can be used by the solid state drive in the local computer without having to transport the entire plot from the remote computer to the local computer. The solid state drive in the local computer can participate in farming using the plot stored in the solid state drive in the remote device.

In another example, the solid state drive in a local computer can autonomously generate proof of space plots. A plot generated in the solid state drive can be transferred to another storage device for storing such that the storage resources occupied by the plot in the solid state drive can be reused to generate another plot. By generating plots and storing the plots in other storage device(s), the solid state drive in the local computer can have access to more plots than physically stored in the solid state drive when the solid state drive is configured to use or rent the storage spaces of the other storage device(e) in plot farming. The solid state drive can be configured to farm the plots through communications with the respective auxiliary storage device(s), which can be in the local computer (e.g., connected to a same peripheral bus as the solid state drive), or in a local area network as the local computer (e.g., in a Network-Attached Storage (NAS) device), or in a remote device connected to the local computer via a communications network, such as the Internet.

For example, when a proof of space challenge is received, from a cryptocurrency network, in the solid state drive of the local computer, the solid state drive can forward the challenge to a solid state drive in the remote device that stores a plot for the solid state drive of the local computer. The solid state drive in the remote device can use the plot stored therein to generate a response and forward the response to the solid state drive in the local computer. The solid state drive in the local computer can then provide the response to the cryptocurrency network for validation.

In some implementations, the solid state drive of the local computer can use a proof of space plot stored in an auxiliary storage device in plot farming; and the auxiliary storage device does not have a solid state drive that can generate a response to a proof of space challenge directly. For example, the proof of space plot can be stored in a hard disk drive that does not have the capability to generate a response to the challenge using the plot stored in the hard disk drive. The solid state drive can transmit, to the auxiliary storage device, a sequence of read requests, generated and responsive to the results of prior read requests, to generate the response to the challenge. However, when the auxiliary storage device has a solid state drive that can generate the response to the challenge without the need the step-by-step read commands from the local computer, the amount of communications between the solid state drive of the local computer and the auxiliary storage device can be reduced. Alternatively, a host system of the remote device can run an application to generate the response to a challenge received from the solid state drive of the local computer.

A solid state drive (SSD) can be configured to automatically farm plots for a cryptocurrency network that uses proof of space. The computing resource requirement for farming a plot is very low. Thus, the controller or a processing device configured to run firmware of the solid state drive can be sufficient to farm a plot with minimum impact, or no impact, on the performance of the solid state drive (SSD) in servicing the host system. Optionally, the solid state drive (SSD) can be configured to farm the plot in the cryptocurrency network when the host system is not actively using the solid state drive (SSD), and/or when the solid state drive (SSD) has not pending commands or requests from the host system. After the solid state drive is configured to farm a plot, the solid state drive (SSD) can operate in the cryptocurrency network, or a blockchain, without assistance from the host system. Optionally, a plot farming application running in the host system can also be configured to access the plot.

The host system can send a command to the solid state drive to allocate or reserve a portion of the storage capacity of the solid state drive for use. Such a portion can have an identification (e.g., as a namespace or a partition) that establishes a logical address space. The host system can request data to be written at a logical address in the logical address space represented by the identification. For example, after a namespace is created in the solid state drive, the host system can send a write command to request a data item to be written at a logical address in the namespace. The logical address is specific to the namespace and independent of other namespaces. The solid state drive maps the logical address in the namespace to a physical address in the solid state drive to execute the write command.

Optionally, when there are storage resources that are not yet allocated to host namespaces that are created in response to commands received from the host system, the memory sub-system can be configured to automatically create plot namespaces to store proof of space plots and support proof of space activities.

Further, the memory sub-system can be configured to rent, borrow, and/or use storage resources of an auxiliary storage device to support its proof of space activities. For example, the auxiliary storage device can be another memory sub-system connected to the same host system through a peripheral bus that is also connected to the memory sub-system, a Network-Attached Storage (NAS) device, a memory sub-system in the Network-Attached Storage (NAS) device, or a remote computing device, or a memory sub-system in the remote computing device, etc.

The plot namespaces, created by the memory sub-system to store proof of space plots, can be configured to be invisible and/or inaccessible to the host system. Thus, the host system can be isolated from the proof of space activities and data (e.g., cryptocurrency data and associated activities). Optionally, the cryptocurrency activities are be configured to be limited within the plot namespaces for improved security of application data of the host system.

The memory sub-system can manage the storage resources in the plot namespaces and free storage resources that have not yet been allocated to namespaces to meet the storage requests from the host system. From the point of view of the host system, the storage resources allocated to the plot namespaces can appear to the host system to be the same as free storage resources that have not yet been allocated to any namespaces. When additional storage resources are to be used by the host system, the memory sub-system can automatically provide the resources from the pool of free storage resources and the storage resources in the plot namespaces. For example, when the currently available free storage resources are insufficient to meet the demand of the host system to create a new namespace or to enlarge an existing namespace, the memory sub-system can delete a plot namespace to return its storage resources as free storage resources.

When the host system sends a command to the memory sub-system to delete a host namespace, the memory sub-system can add to the pool the storage resources reclaimed form the deleted host namespace as free storage resources. When the currently available free storage resources are sufficient to store a proof of space plot, the memory sub-system can allocate free storage resources to create a plot namespace.

Optionally, the host system can send a command to the memory sub-system to create a namespace with an indication that the namespace is created for proof of space activities. In response, the memory sub-system can create and manage the plot namespace for proof of space activities. The command from the host system to create the plot namespace can be configured as a permission for the host system to allow the memory sub-system to participate in proof of space activities using the resources allocated to the plot namespace. When the storage resources of the plot namespace are needed for host namespaces, the memory sub-system can delete the plot namespace without an explicit command from the host system for the destruction of the plot namespace. Optionally, the host system can send a command to explicitly request the destruction/deletion of the plot namespace and thus participate in the management of the plot namespace.

Optionally, the host system can request the memory sub-system to identify plot namespaces present on the memory sub-system and use the plot namespaces to participate in proof of space activities.

In some implementations, the management functions of free storage resources and plot namespaces are implemented at least in part in the host system. For example, a module in the operation system and/or a device driver running in the host system can be configured to manage the free storage resources and plot namespaces such that the remaining operating system and applications running the host system can be free from the handling of the plot namespaces and their storage resources.

Optionally, the memory sub-system can have firmware configured to control proof of spaces activities. For example, a solid state drive (SSD) can be configured with a host interface to provide storage services to a host system in a conventional way. The firmware running in the solid state drive (SSD) can participate in proof of space activities and/or cryptocurrency activities in an autonomous way without the supervision and/or computing resources of an external host system connected to the host interface. For example, in the absence of commands from the host system connected to the host interface, the firmware of the solid state drive can be configured to automatically detect a network connection, generate read/write commands, and perform computations to participate in proof of space activities and/or cryptocurrency activities.

For example, independent of host activities and/or without the host system being active and/or connected to the host interface of the solid state drive (SSD), the firmware can perform tasks such as plot generation, plot farming, etc.

Thus, the solid state drive (SSD) as a spare component can be used in proof of space before being connected to a host system for normal usage.

The firmware can be configured to use the free space that is not yet used by its host system to generate and/or store one or more plots for proof of space. For example, the firmware can use a plot stored in the memory sub-system (e.g., a hard disk drive (HDD), a solid state drive (SSD), or a memory module) to generate responses for challenges, such as proof of space and time challenges in a cryptocurrency network (e.g., Chia Network, or similar networks).

For improved security, aspects of proof of space activities and/or cryptocurrency activities of the firmware running in the memory sub-system can be configured and/or regulated via configuration data specified using an administrative application. For example, the administrative control of the firmware can be accessed via the host system connected to the host interface of the memory sub-system. Alternatively, or in combination, the administrative control of the firmware can be accessed via a network connection (e.g., without the host system being active or being connected to the host interface).

In some implementations, the memory sub-system can be operational for proof of space activities and/or cryptocurrency activities even without a host system (or with the host system being placed in a sleep mode, a low energy mode, or a hibernation mode). For example, connecting the memory sub-system to a power supply and a network interface card can be sufficient to allow the memory sub-system to operate in a cryptocurrency network. Alternatively, the memory sub-system can be configured to operate in a cryptocurrency network under the condition that the memory sub-system is being connected to a host system that permits the memory sub-system to operate (e.g., when the host system is in an idle state, or independent of the activities of the host system). In some instances, the memory sub-system includes a network interface card, or a wireless transceiver for a network connection to a wireless access point. Thus, before the memory sub-system is installed in a computing system and/or connected to a host system to provide memory and/or storage services for the host system, the firmware of the memory sub-system can allow the free/available storage space of the memory sub-system to be used as a storage appliance in a cryptocurrency network for proof of space.

The memory sub-system can include an internal host configured to reduce the computation burden on the host system connected to the host interface of the memory sub-system. The internal host can be implemented in part via the firmware of the memory sub-system. For example, the host system and the internal host can operate in a collaborative mode where the host system can delegate some or all of the computing tasks to the memory sub-system in activities in a cryptocurrency network.

In general, the administrative control can be used to specify whether the proof of space functionality of the firmware is permitted to run autonomously, how much of the resources the firmware can use and when, what types of activities (e.g., plot generation, plot farming) are permitted, etc.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

In general, a memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or such a computing device that includes memory and a processing device.

The computing system 100 can include a host system 120 that is coupled to one or more memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

For example, the host system 120 can include a processor chipset (e.g., processing device 118) and a software stack executed by the processor chipset. The processor chipset can include one or more cores, one or more caches, a memory controller (e.g., controller 116) (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, a universal serial bus (USB) interface, a Fibre Channel, a Serial Attached SCSI (SAS) interface, a double data rate (DDR) memory bus interface, a Small Computer System Interface (SCSI), a dual in-line memory module (DIMM) interface (e.g., DIMM socket interface that supports Double Data Rate (DDR)), an Open NAND Flash Interface (ONFI), a Double Data Rate (DDR) interface, a Low Power Double Data Rate (LPDDR) interface, a Compute Express Link (CXL) interface, or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The processing device 118 of the host system 120 can be, for example, a microprocessor, a central processing unit (CPU), a processing core of a processor, an execution unit, etc. In some instances, the controller 116 can be referred to as a memory controller, a memory management unit, and/or an initiator. In one example, the controller 116 controls the communications over a bus coupled between the host system 120 and the memory sub-system 110. In general, the controller 116 can send commands or requests to the memory sub-system 110 for desired access to memory devices 130, 140. The controller 116 can further include interface circuitry to communicate with the memory sub-system 110. The interface circuitry can convert responses received from the memory sub-system 110 into information for the host system 120.

The controller 116 of the host system 120 can communicate with the controller 115 of the memory sub-system 110 to perform operations such as reading data, writing data, or erasing data at the memory devices 130, 140 and other such operations. In some instances, the controller 116 is integrated within the same package of the processing device 118. In other instances, the controller 116 is separate from the package of the processing device 118. The controller 116 and/or the processing device 118 can include hardware such as one or more integrated circuits (ICs) and/or discrete components, a buffer memory, a cache memory, or a combination thereof. The controller 116 and/or the processing device 118 can be a microcontroller, special purpose logic circuitry (e.g., a field programmable gate array (FPGA), an application specific integrated circuit (ASIC), etc.), or another suitable processor.

The memory devices 130, 140 can include any combination of the different types of non-volatile memory components and/or volatile memory components. The volatile memory devices (e.g., memory device 140) can be, but are not limited to, random access memory (RAM), such as dynamic random access memory (DRAM) and synchronous dynamic random access memory (SDRAM).

Some examples of non-volatile memory components include a negative-and (or, NOT AND) (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs, or any combination of such. In some embodiments, a particular memory device can include an SLC portion, an MLC portion, a TLC portion, a QLC portion, and/or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as 3D cross-point type and NAND type memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations (e.g., in response to commands scheduled on a command bus by controller 116). The controller 115 can include hardware such as one or more integrated circuits (ICs) and/or discrete components, a buffer memory, or a combination thereof. The hardware can include digital circuitry with dedicated (i.e., hard-coded) logic to perform the operations described herein. The controller 115 can be a microcontroller, special purpose logic circuitry (e.g., a field programmable gate array (FPGA), an application specific integrated circuit (ASIC), etc.), or another suitable processor.

The controller 115 can include a processing device 117 (processor) configured to execute instructions stored in a local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 does not include a controller 115, and can instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory devices 130. The controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory devices 130.

In some embodiments, the memory devices 130 include local media controllers 150 that operate in conjunction with the memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 150) for media management within the same memory device package. An example of a managed memory device is a managed NAND (MNAND) device.

The controller 115 and/or a memory device 130 can include a proof of space manager 113 configured to manage the unused portion of the storage capacity of the memory sub-system 110 to show proof of space without the help or commands from the host system 120. In some embodiments, the controller 115 in the memory sub-system 110 includes at least a portion of the proof of space manager 113. In other embodiments, or in combination, the controller 116 and/or the processing device 118 in the host system 120 includes at least a portion of the proof of space manager 113. For example, the controller 115, the controller 116, and/or the processing device 118 can include logic circuitry implementing the proof of space manager 113. For example, the controller 115, or the processing device 118 (processor) of the host system 120, can be configured to execute instructions stored in memory for performing the operations of the proof of space manager 113 described herein. In some embodiments, the proof of space manager 113 is implemented in an integrated circuit chip disposed in the memory sub-system 110. In other embodiments, the proof of space manager 113 can be part of firmware of the memory sub-system 110, an operating system of the host system 120, a device driver, or an application, or any combination therein.

For example, the proof of space manager 113 implemented in the controller 115 can manage storage resources, unused by the host system 120, in the memory sub-system 110, generate plots and/or farm plots in the unused portion to participate in activities in a cryptocurrency network, without relying on the computing resources of the host system 120. The host system 120 can be in a low power mode, a sleep mode, or a hibernation mode, while the proof of space manager 113 is sufficient to operate the memory sub-system 110 to participate activities in a cryptocurrency network. Optionally, the proof of space manager 113 can function as a host, specialized for proof of space activities and/or cryptocurrency activities, such that resources in the memory sub-system 110 that are not used by the host system 120 can be used to gain benefits of participating in proof of space activities and/or cryptocurrency activities.

When the memory sub-system 110 is in communication with the host system 120, the host system 120 can send commands to configure the operations of the proof of space manager 113. For example, the host system 120 can provide a user interface that is usable to specify whether the proof of space manager 113 is permitted to operate autonomously without instructions/requests from the host system 120. The permission can be specified by writing data to a register, or a predetermined location or region within a memory device (e.g., 130 or 140) in the memory sub-system 110. Similarly, the host system 120 can write configuration data into the memory sub-system 110 to specify how much, if not all of the unused portion, of the storage capacity of the memory sub-system 110 can be used by the proof of space manager 113 in proof of space activities, when or under what conditions the proof of space activities are permitted, whether plot generation is permitted, whether plot farming is permitted, etc.

Optionally, the proof of space manager 113 can use a network connection without going through the host system 120; and the configuration data can be specified for the proof of space manager 113 via the network connection. For example, the memory sub-system 110 can include an interface for a connection to a network interface card, or a wireless transceiver for a wireless network connection to an access point. The interface is usable by the proof of space manager 113 without the processing device 118 and/or the controller 116 of the host system 120. In some implementations, the memory sub-system 110 can further include a network interface card and/or a wireless transceiver (e.g., for a wired network connection, for a WiFi connection, or Bluetooth connection, or a cellular communications connection); and providing power to the memory sub-system 110 with a connection to the Internet is sufficient to enable the memory sub-system 110 to operate in a cryptocurrency network.

Figure 2:
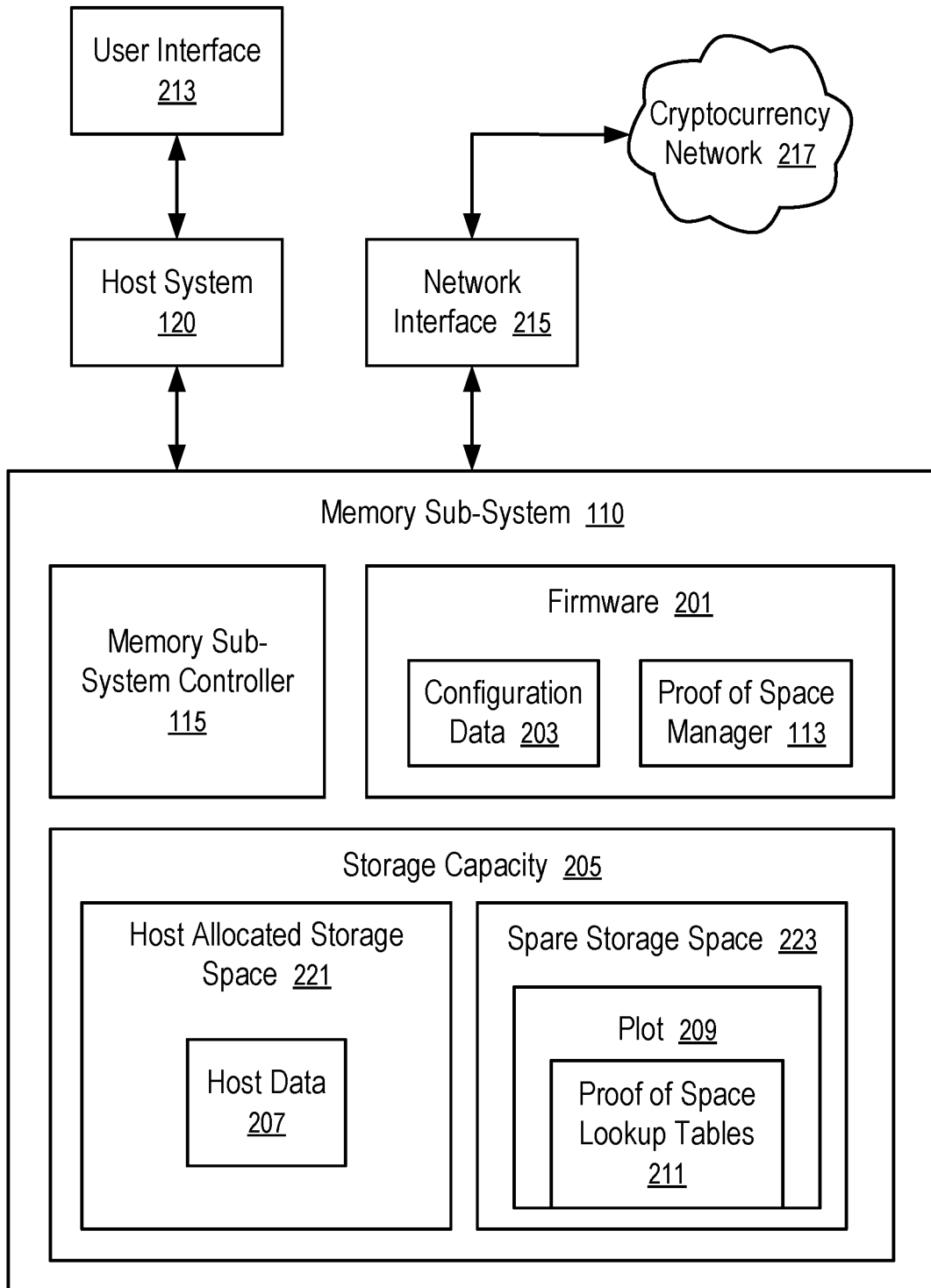
FIG. 2 shows a memory sub-system having firmware to manage storage space to support proof of space activities according to one embodiment.

FIG. 2 shows a memory sub-system 110 having firmware 201 to control proof of space activities according to one embodiment. For example, the memory sub-system 110 of FIG. 1 can be implemented according to FIG. 2.

In FIG. 2, the memory sub-system 110 has a memory sub-system controller 115 and firmware 201. The firmware 201 has configuration data 203 and a proof of space manager 113 configured to operate according to the permissions and restrictions specified in the configuration data 203.

The storage capacity 205 of the memory sub-system 110 can include a host allocated storage space 221 and a spare storage space 223.

The host allocated storage space 221 is a portion of the storage capacity 205 explicitly reserved by the host system 120 for use by the operating system and/or applications running in the host system 120. The host system 120 transmits one or more commands to the memory sub-system 110 to reserve the space 221 (e.g., by creating one or more namespaces or partitions of host-specified sizes). The host allocated storage space 221 is not available for proof of space plots and activities controlled by the proof of space manager 113. The host system 120 can send write commands to the memory sub-system 110 to store host data 207 in the host allocated storage space 221.

The spare storage space 223 is a portion of the storage capacity that is not reserved and not used by the host system 120 for storing host data 207 used by the operating system and/or applications running in the host system. The proof of space manager 113 can automatically identify the spare storage space 223 and used it for proof of space activities controlled by the proof of space manager 113, such as generating and storing a plot 209, farming the plot 209 for the cryptocurrency network 217, etc.

The proof of space manager 113 can be configured to use the spare storage space 223 when its storage resources is not required for the operation of the host system 120. When the host system 120 needs a portion of the resources of the spare storage space 223, the proof of space manager 113 can manage the reclaiming of the resources from the plot 209 as if the resources were free and had not been used by the plot 209. Thus, the operations of proof of space manager 113 related to the plot 209 has no impact, or minimized impact, on the host system 120 accessing the resources in the spare storage space 223.

When the host system 120 sends, to the memory sub-system 110, a command to reduce the host allocated storage space 221 (e.g., by deleting a namespace or partition, downsizing a namespace or partition), storage resources freed via the execution of the command become part of the spare storage space 223 usable to support proof of space activities.

When the host system 120 sends, to the memory sub-system 110, a command to increase the host allocated storage space 221 (e.g., by creating a new namespace or partition, enlarging a namespace or partition), the proof space manager 113 can reduce the storage resources used by plots (e.g., 209) to allocate sufficient storage resources to the host allocated storage space 221 (e.g., via deleting a plot 209).

Optionally, the host system 120 can send a command to the memory sub-system 110 to reserve at least a portion of the spare storage space 223 for one or more plots (e.g., 209). The host system 120 indicates to the memory sub-system 110 such a reserved portion is for proof of space; and in response, the memory sub-system 110 can take over the responsibility for managing the portion as part of the spare storage space 223 and/or the de-allocation of the portion when storage resources are needed for host data 207 and/or the host allocated storage space 221.

Optionally, when the memory sub-system 110 is not connected to the host system 120, the firmware 201 can be configured to control the operations of the memory sub-system 110 and the network interface 215.

For example, the firmware 201 running in the memory sub-system controller 115 can detect the connection to a network interface 215 and issue commands to the network interface 215 and the memory sub-system controller 115 in a way similar to the host system 120 using the memory sub-system 110 and the network interface 215. The proof of space manager 113 can use a portion of the storage capacity 205 of the memory sub-system 110 to generate and store a plot 209 that includes proof of space lookup tables 211, and use the plot 209 to generate responses to proof of space challenges.

The storage capacity 205 of the memory sub-system 110 can include the storage capacities of memory devices (e.g., memory devices 130, 140 illustrated in FIG. 1) configured in the memory sub-system 110. A portion of the storage capacity 205 (e.g., host allocated storage space 221) can be reserved for servicing the host system 120 and store host data 207 received from the host system 120. The remaining portion of the storage capacity 205 (e.g., the spare storage space 223) that is not going to be used by the host system 120 for a period of time can be used to store a plot 209. Since the plot 209 is used to store the proof of space lookup tables 211, the storage space occupied by the plot 209 is not available for use by the host system 120 and thus considered the free/spare storage space 223.

To generate the plot 209, the proof of space manager 113 can receive a small amount of initial data and perform computations to compute the numbers in the proof of space lookup tables 211 according to a predefined computing procedure. In general, any algorithms of proof of space can be used; and the implementation of the proof of space manager 113 is not limited to a particular cryptocurrency network (e.g., Chia Network).

To farm the plot 209, the proof of space manager 113 can receive a challenge and use the plot 209 to generate a response that can be easily validated using the small amount of the initial data. The correct, validated response can be seen as a proof that the large amount of data of the plot 209 is stored in a storage space (e.g., in storage capacity 205 provided by memory devices 130, . . . , 140 of the memory sub-system 110).

Optionally, the host system 120 can also run an application to generate plots (e.g., as part of the host data 207) and farm the plots. Thus, the memory sub-system 110 is operable to have two parallel systems for plot generating and farming.

For example, after a namespace is allocated in the storage capacity 205, a logical storage location in the portion of storage capacity 205 represented by the namespace can be referred to via a combination of the namespace and a logical address within the namespace. The memory sub-system controller 115 can map such a logical address in the namespace into a physical address in the memory device(s) 130, . . . , 140 to store data (e.g., the host data 207, or the data of the plot 209).

Optionally, the firmware 201 can be configured to automatically allocate a portion of the storage capacity 205 not used by the host system 120 to one or more namespaces hidden to the host system 120 to store plot 209 controlled by the proof of space manager 113. When the storage resources used by the plot 209 are needed for an operation of the host system 120, the firmware 201 can dynamically delete the namespace used to host the plot 209 and provide the reclaimed storage resources for use by the host system 120, as if it had never been used for storing the plot 209.

Optionally, each plot 209 is hosted in a separate namespace to simplify storage space management and/or reduce or minimize the granularity of namespaces used for plots (e.g., 209). When the storage space currently used by a plot (e.g., 209) is to be used by the host system 120, the proof of space manager 113 can dynamically delete the plot namespace and free up the storage space occupied by the plot (e.g., 209) for the host system 120.

In one implementation, the proof of space manager 113 is implemented via a hardware component, such as a field programmable gate array (FPGA), an application specific integrated circuit (ASIC), a System on a Chip (SoC), etc. The memory sub-system 110 can be configured with two host interfaces. One host interface of the memory sub-system 110 is connectable to an external host system 120; and another host interface is connected to the hardware component of the proof of space manager 113. The memory sub-system controller 115 is accessible via any of the two host interfaces to receive read/write commands from the external host system 120 and the proof of space manager 113 respectively.

Alternatively, as illustrated in FIG. 2, the proof of space manager 113 is implemented as part of the firmware 201 running in the processing device 117 of the memory sub-system controller 115. Thus, a portion of the processing power of the memory sub-system controller 115 can be used to execute the instructions of the proof of space manager 113 (e.g., to generate read/write commands related to the plot 209) without a physical host interface between the memory sub-system controller 115 and the proof of space manager 113.

The host system 120 can run an application to provide a user interface 213 to specify and/or adjust the configuration data 203 of the proof of space manager 113. Alternatively, a user device (e.g., a mobile phone, a tablet computer, a notebook computer, a personal computer, a personal media player) can be connected to the network interface 215 to specify and/or adjust the configuration data 203. The network interface 215 can include a transceiver for a wired or wireless network connection, such as a local area network, a wireless local area network, a personal area network, a cellular communications network, etc. The network interface 215 can be connected to a cryptocurrency network 217 that implements a blockchain using proof of space to regulate activities or transactions.

The configuration data 203 can include resource restrictions, allowed activities, account identification, permissions, etc.

For example, resource restrictions can specify a limit on the percentage of the storage capacity 205 of the memory sub-system 110 that is allowed to be used by the proof of space manager 113 to store one or more plots 209.

For example, resource restrictions can specify a limit on the percentage of the computing resources of the memory sub-system controller 115 that can be used by the proof of space manager 113.

For example, resource restrictions can specify a limit on data access bandwidth to the storage capacity 205 that is allowed to be used by the proof of space manager 113.

For example, resource restrictions can specify a limit on program-erase budget of the storage capacity 205 that is allowed to be used by the proof of space manager 113.

When an activity (e.g., plot generation, plot farming) is explicitly specified as one of the allowed activities, the proof of space manager 113 can perform the activities when connected to the network interface 215 and/or the cryptocurrency network 217. Otherwise, the proof of space manager 113 is blocked to prevent the activity that is not included in the allowed activities.

The configuration data 203 can include account identification associated with an account in the cryptocurrency network 217 and/or the plot 209. For example, the account identification can include a cryptographic key used to represent an owner of the account and/or as part of an initial data to generate the plot 209.

The permissions in the configuration data 203 can specify whether and/or when the proof of space manager 113 can operate autonomously. For example, the permissions can be configured to indicate that the proof of space manager 113 is permitted to start operation after receiving an explicit request from the host system 120. For example, the permissions can be configured to indicate that the proof of space manager 113 can operate autonomously when the host system 120 is inactive but cannot operate when the host system 120 is active. For example, the permissions can be configured to indicate that proof of space manager 113 can operate whenever the proof of space manager 113 can access the cryptocurrency network 217.

Figure 3:
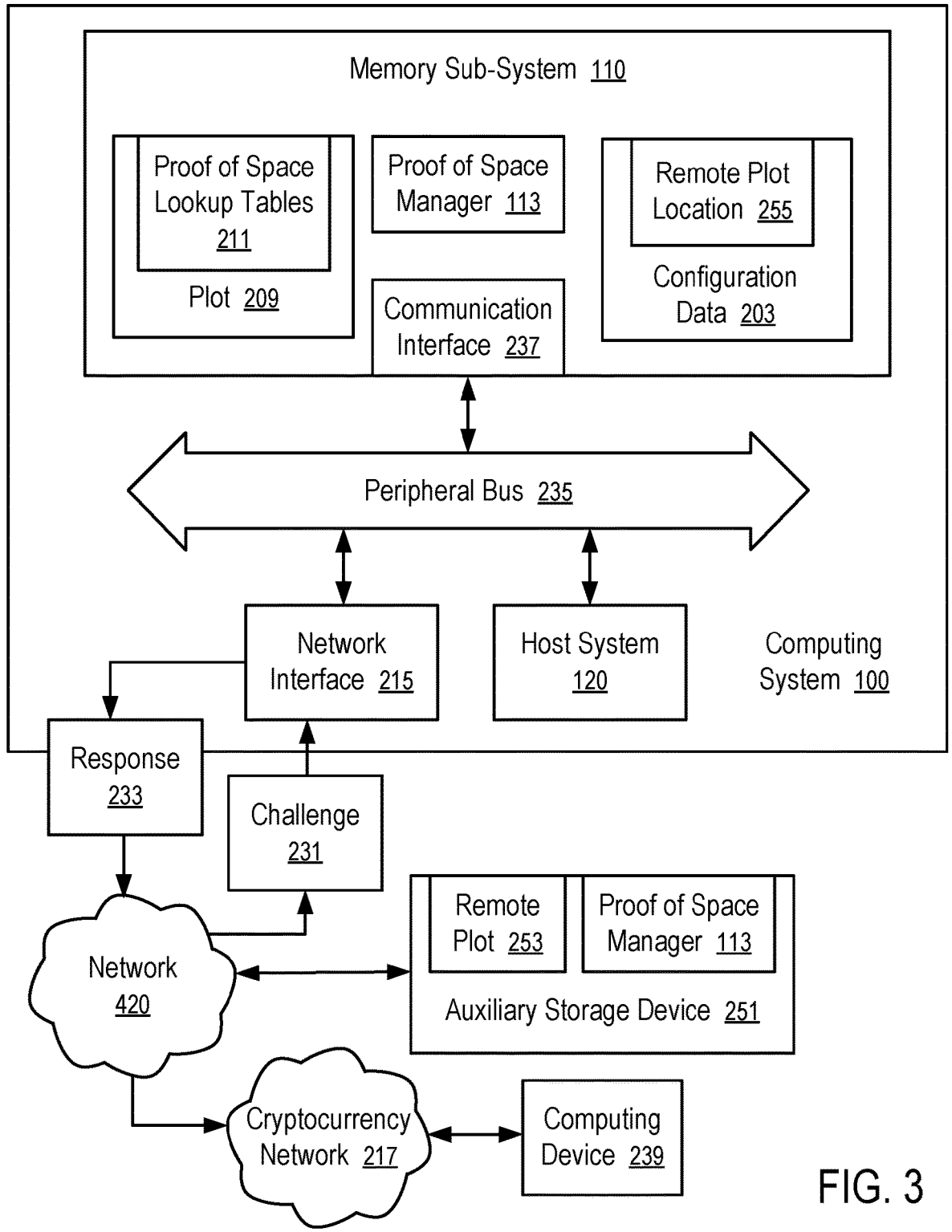
FIG. 3 and FIG. 4 show examples of memory sub-systems generating responses to proof of space challenges using remotely stored proof of space plots according to some embodiments.
Figure 4:
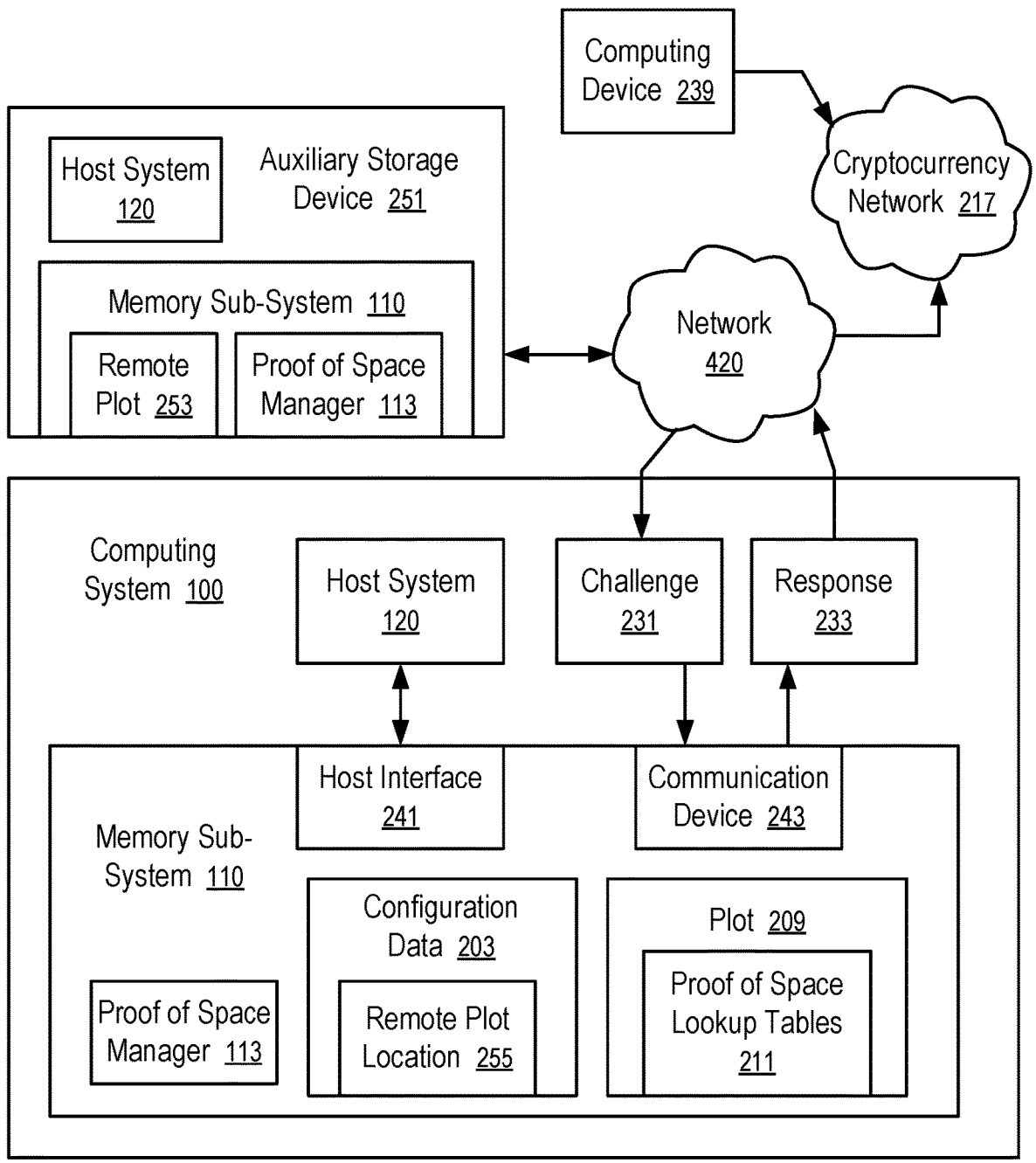

FIG. 3 and FIG. 4 show examples of memory sub-systems generating responses to proof of space challenges using remotely stored proof of space plots according to some embodiments. The examples of FIG. 3 and FIG. 4 can be implemented using the memory sub-system 110 of FIG. 1 and/or FIG. 2.

In FIG. 3, the memory sub-system 110 has a communication interface 237 that can function as a host interface in communication with the host system 120. A peripheral bus 235 connects the host system 120, the network interface 215, and the communication interface 237. The host system 120 can use the network interface 215 via the peripheral bus 235.

In one implementation, the communication interface 237 can function as a host of the network interface 215 under a predetermined condition. For example, when the host system 120 is in a low power mode, a sleep mode, a hibernation mode, or when the host system 120 is not using the peripheral bus 235, the communication interface 237 can function as a host of the network interface 215 to use the network interface 215.

When the memory sub-system 110 is in control of the network interface 215, the proof of space manager 113 in the memory sub-system 110 can receive a proof of space challenge 231 from a cryptocurrency network 217, use the proof of space lookup tables 211 to generate a winning response 233, and provide the response 233 through the communication interface 237, the peripheral bus 235, and the network interface 215 to the cryptocurrency network 217.

In some instances, a user interface 213 (e.g., as in FIG. 2) can be used to set up the configuration data 203 to control the activities of the proof of space manager 113. The configuration data 203 can include the identification of a remote plot location 255 where storage spaces outside of the memory sub-system 110 can store a remote plot 253 usable by the proof of space manager 113 in generate a response 233 to the challenge 231.

For example, the remote plot location 255 can be in an auxiliary storage device 251 accessible to the proof of space manager 113 through a network 420. For example, the auxiliary storage device 251 can be a remote computing device, a memory sub-system similar to the memory sub-system 110 in the remote computing device, a Network-Attached Storage (NAS) device, or a memory sub-system similar to the memory sub-system 110 in the Network-Attached Storage (NAS) device, etc. Alternatively, the auxiliary storage device 251 can be connected to the peripheral bus 235 and be part of the computing system 100.

In one example, after the memory sub-system 110 generates a plot 209 in the spare storage space 223 of the memory sub-system 110, the plot 209 can be transferred to the auxiliary storage device 251 and stored as the remote plot 253. Subsequently, the memory sub-system 110 generates another plot 209 in the spare storage space 223 of the memory sub-system 110. Thus, the proof of space manager 113 of the memory sub-system 110 can use plots 209 and 253 to generate responses 233 to proof of space challenges 231, where the combination of the plots 209 and 253 exceeds the capacity of the spare storage space 223 of the memory sub-system 110.

In another example, the remote plot 253 is generated by a memory sub-system (e.g., similar to the memory sub-system 110 of the computing system 100) that is installed within the auxiliary storage device 251. The configuration data 203 identifies the remote plot 253 to allow the proof of space manager 113 to perform plot farming using the remote plot 253 without communicating the entire remote plot 253 to the memory sub-system 110, even when the spare storage space 223 of the memory sub-system 110 has sufficient storage resources to host the remote plot 253. Optionally, the auxiliary storage device 251 can obtain the remote plot 253 through other techniques, such as computing by an application running in a host system of the auxiliary storage device 251, pre-installation by a device manufacturer, etc.

Optionally, the cryptocurrency network 217 is configured with a computing device 239 that runs an application configured to operate in the cryptocurrency network 217. The memory sub-system 110 can be connected via the network interface 215 to the computing device 239 to function as a remote storage device of the computing device 239. Thus, when the computing device 239 is requested by the cryptocurrency network 217 to provide a proof of space response 233 to a challenge 231, the computing device 239 can transmit the challenge 231 to the memory sub-system 110. In response, the proof of space manager 113 generates the response 233 by reading the proof of space lookup tables according to the challenge 231, and/or forwarding the challenge 231 to the auxiliary storage device 251.

For example, the auxiliary storage device 251 configured in a way similar to the computing system 100. A memory sub-system 110 installed in the auxiliary storage device 251 can generate a response 233 to the challenge 231 received from the computing system 100 and/or its memory sub-system 110 to generate, in a way similar to the memory sub-system 110 generating a response 233 using a plot 209 stored in its spare storage space 223. The memory sub-system 110 installed in the auxiliary storage device 251 then transmits the response 233 to the proof of space manager 113 in the computing system 100, which in turn provides the response 233 to the cryptocurrency network 217 for validation.

Optionally, the auxiliary storage device 251 is another memory sub-system connected to the peripheral bus 235 in the computing system 100, instead of being connected to the computing system 100 via the network 420. For example, the auxiliary storage device 251 can be a hard disk drive that does not have a proof of space manager. In such an implementation, the memory sub-system 110 can function as a host to the auxiliary storage device 251 over the peripheral bus 235 (e.g., in a way similar to controlling the network interface 215); and the memory sub-system 110 can issue read commands, according to the challenge 231 and results of prior read commands, to read proof of space lookup tables in the remote plot 253 stored in the auxiliary storage device 251 in generating the response 233.

Optionally, a cryptocurrency application running in a computing device 239 in the cryptocurrency network 217 can use the memory sub-system 110, as controlled by the proof of space manager 113, as a remote storage device. The computing device 239 can issue read commands, according to the challenge 231 and results of prior read commands, to read proof of space lookup tables 211 in the plot 209 stored in the memory sub-system 110 to generate the response 233 to the challenge 231. However, it is more efficient to have the proof of space manager 113 to generate the response 233 in response to the challenge 231, instead of reading individual entries in the proof of space lookup tables in response to separate read commands, and providing the entries separately to the computing device 239, to support the computing device 239 to generate the response 233 to the challenge 231.

Similarly, it is more efficient to have a proof of space manager 113 configured in the auxiliary storage device 251 to generate the response 233, before providing the response 233 to the proof of space manager 113 in the computing system 100, when the remote plot 253 is used.

In some implementations, the host system 120 can run an operating system, a device driver, and/or an application to moderate the communications between the network interface 215 and the communication interface 237 for communications with the cryptocurrency network 217. Thus, it is not necessary for the communication interface 237 to have the capability of functioning as a host of the network interface 215 directly over the peripheral bus 235.

For example, the computing system 100 can be configured to provide a portion of the storage capacity 205 of the memory sub-system 110 as a remote storage device of the computing device 239 in the cryptocurrency network 217. The portion can be the spare storage space 223, or plot namespaces that are created by the proof of space manager 113 to store plots (e.g., 209). Similarly, the auxiliary storage device 251 can be configured to provide a portion of its storage capacity as a remote storage device of the proof of space manager 113 in the computing system 100.

For example, the portion of the storage capacity 205 of the memory sub-system 110 can be configured as a special-purpose storage device configured to store plots (e.g., 209), receive proof of space challenges (e.g., 231) and provide corresponding responses (e.g., 233) made using the stored plots (e.g., 209). The computing system 100 can prevent the computing device 239 from accessing the portion of the storage capacity 205 as a remote storage device in ways inconsistent with proof of space activities relied upon the stored plots (e.g., 209) (e.g., writing data not representative of a plot into the remote storage device, reading data from a plot namespace in the remote storage device in a sequence different from what is required to generate a response to a proof of space challenge). Similarly, the auxiliary storage device 251 can be configured to prevent the proof of space manager 113 to access the storage resources storing the remote plot 253 in ways inconsistent with proof of space activities relied upon the stored plot 253.

Alternatively, the application of the cryptocurrency network 217 can run in the host system 120. Alternatively, the cryptocurrency application can be configured as part of the proof of space manager 113 and/or the firmware 201 of the memory sub-system 110.

FIG. 4 shows an example in which the memory sub-system 110 has a network communication device 243 separate from its host interface 241. For example, the network communication device 243 can be a network interface 215 for a wired or wireless computer network connection, or a wireless transceiver for a wireless connection to an access point or base station that is connected to the cryptocurrency network 217.

Thus, the memory sub-system 110 can have a network connection to the cryptocurrency network 217 and the auxiliary storage device 251, independent of the state and operations of the host system 120. Using the network connection, the proof of space manager 113 of the memory sub-system 110 can receive a proof of space challenge 231, and provide a corresponding response 233 using the plot 209 stored in the spare storage space 223 and/or the remote plot 253 stored in the auxiliary storage device 251.

For example, the memory sub-system 110 in the auxiliary storage device 251 can have a proof of space manager 113 in a way as the memory sub-system 110 in the computing system 100. The proof of space manager 113 in the auxiliary storage device 251 can be configured to operate independently on the state and operations of the host system 120 in the auxiliary storage device 251. In some instances, once configured, the memory sub-system 110 can operate as the auxiliary storage device 251 without a host system 120 being connected to it in the auxiliary storage device 251.

Similarly, in some implementations, the memory sub-system 110 of FIG. 4 can operate in the cryptocurrency network 217 without the host system 120; and the proof of space activities of the memory sub-system 110, as controlled by the proof of space manager 113, can be limited according to parameters specified in the configuration data 203. The configuration data 203 can include a section identifying remote plot locations 255 where remote plots 253 are stored outside of the memory sub-system 110. The remote plot 253 in the auxiliary storage device 251 can be controlled by a proof of space manager 113 operated within the auxiliary storage device 251 to provide services to the proof of space manager 113 configured with identification and/or permission associated with the respective remote plot location 255.

Figure 5:
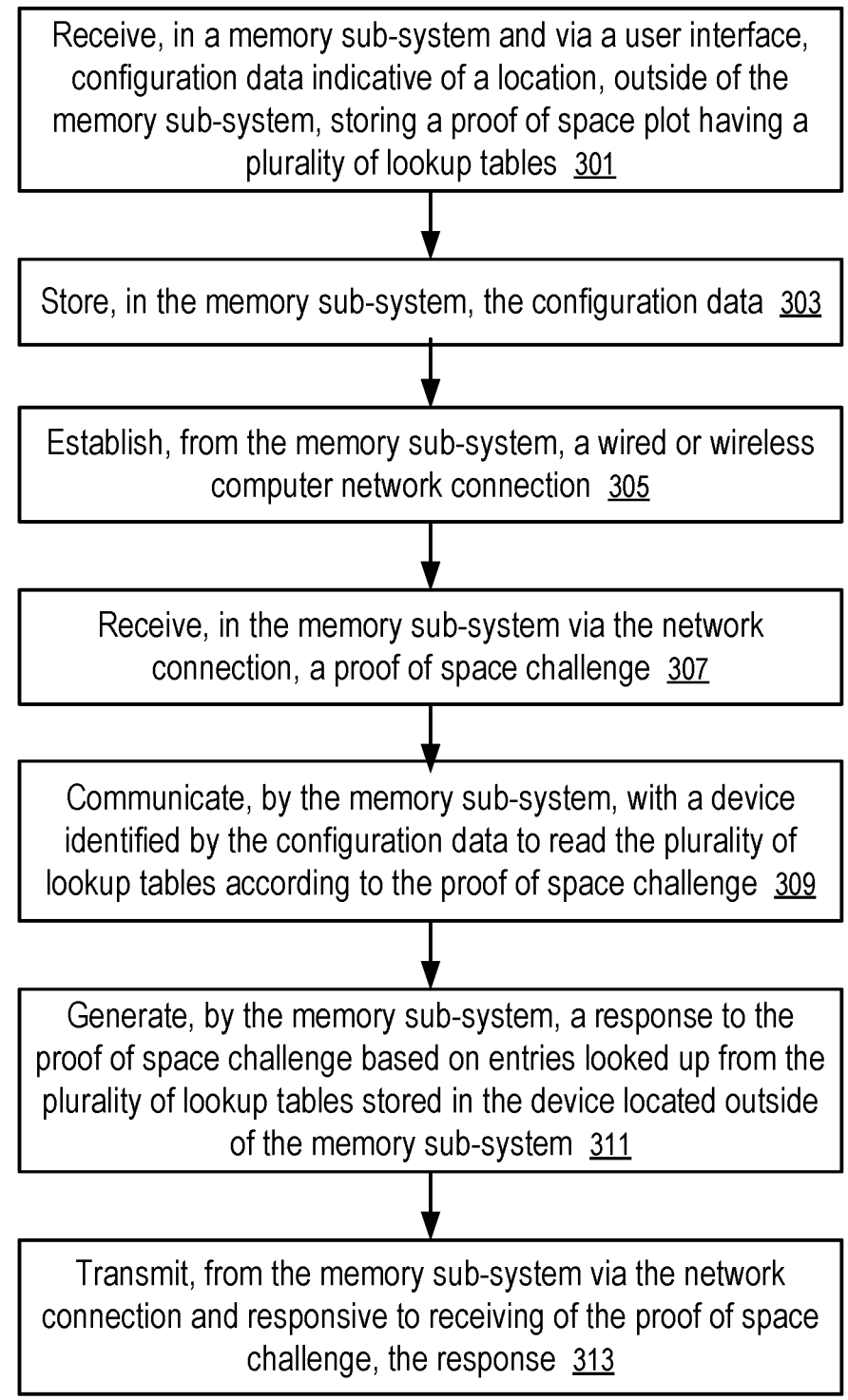
FIG. 5 shows a method to farm proof of space plots according to one embodiment.

FIG. 5 shows a method to farm proof of space plots according to one embodiment. The method of FIG. 5 can be performed by processing logic that can include hardware (e.g., processing device, circuitry, dedicated logic, programmable logic, microcode, hardware of a device, integrated circuit, etc.), software/firmware (e.g., instructions run or executed on a processing device), or a combination thereof. In some embodiments, the method of FIG. 5 is performed at least in part by the controller 115 and/or the local media controller 150 of the memory sub-system 110 in FIG. 1, and/or by the processing device 118 of the host system 120. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

For example, the method of FIG. 5 can be implemented using the proof of space manager 113 of FIG. 1 and/or FIG. 2 using techniques of FIG. 3 and FIG. 4.

At block 301, a memory sub-system 110 receives, via a user interface 213, configuration data 203 indicative of a location, outside of the memory sub-system 110, storing a proof of space plot 253 having a plurality of lookup tables 211.

At block 303, the memory sub-system 110 stores the configuration data to control its operations in proof of space activities.

For example, the user interface 213 can be configured to receive a user input representative of a permission for the memory sub-system 110 to use storage resources of the device 239 to store data associated with proof of space activities, or a permission for the memory sub-system 110 to use the proof of space plot 253 in the device 239 in responding to proof of space challenges, or any combination of permissions thereof.

For example, with the permission to use the storage resources of the auxiliary storage device 251, the memory sub-system 110 can generate the proof of space plot 253 in the memory sub-system 110 initially and then transfer the proof of space plot 253 from the memory sub-system 110 to the auxiliary storage device 251.

For example, the auxiliary storage device 251 can generate and store the proof of space plot 253 and then announce, in a network 420, availability of the proof of space plot 253 for use by other memory sub-systems (e.g., 110) in their proof of space activities. With the permission to use the proof of space plot 253 stored in the auxiliary storage device 251, the memory sub-system 110 can generate responses to proof of space challenges using the proof of space plot 253 without having to store the proof of space lookup tables 211 of the plot 253 in its storage capacity 205.

For example, with a number of auxiliary storage devices (e.g., 251) offering their plots (e.g., 253) and/or their storage resources in the network 420, the user interface 213 can be used to select the auxiliary storage device 251 and/or the remote plot 253 for use in the proof of space activities of the memory sub-system 110. The selection can be used to generate the configuration data 203 that includes an identification of the auxiliary storage device 251, a portion of its storage resources, and/or a mote plot 253.

At block 305, the memory sub-system 110 establishes a wired or wireless computer network connection to a computer network 420.

At block 307, the memory sub-system 110 receives, via the network connection, a proof of space challenge 231 (e.g., from a cryptocurrency network 217).

At block 309, the memory sub-system 110 communicates with a device 251 identified by the configuration data 203 to read the plurality of lookup tables 211 according to the proof of space challenge 231.

In some instances, the auxiliary storage device 251 can be configured in way similar to the computing system 100 to have a memory sub-system 110 and/or a proof of space manager 113 to perform operations of proof of space activities. Thus, the memory sub-system 110 in the computing system 100 can send, via the network connection, the proof of space challenge 231 to the auxiliary storage device 251 to cause the device 251 to read the plurality of lookup tables 211 of the remote plot 253 and generate the response 233. The memory sub-system 110 can receive, from the auxiliary storage device 251, the response 233 generated by the device 251 without having to receive the entries looked up from the lookup tables 211 according to the proof of space challenge 231. The memory sub-system 110 of the auxiliary storage device 239 and/or the proof of space manager 113 of the auxiliary storage device 239 can automatically look up the entries. For example, after reading a first entry of a first lookup table, among the plurality of lookup tables 211, according to the proof of space challenge 231, the proof of space manager 113 in the auxiliary storage device 251 can automatically read a second entry of a second lookup table, among the plurality of lookup tables 211, according to the first entry, without having to transmit the first entry to the computing system 100 to obtain/generate a command to read the second lookup table.

At block 311, the memory sub-system 110 generates a response 233 to the proof of space challenge 231 based on entries looked up from the plurality of lookup tables 211 of the plot 253 stored in the device 251 located outside of the memory sub-system 110.

At block 313, the memory sub-system 110 transmits, via the network connection and responsive to receiving of the proof of space challenge 231, the response 233 (e.g., to the cryptocurrency network 217).

In some implementations, the auxiliary storage device 251, a host system 120, and the memory sub-system 110 in the computing system 100 are connected to a same peripheral bus 235. The response 233 can be generated during a time period in which the host system is in a low power mode, a sleep mode, or a hibernation mode. The memory sub-system 110 can control the auxiliary storage device 251 on the peripheral bus 235 and a network interface 215 on the peripheral bus 235 via operating the memory sub-system 110 as a host of the network interface 215 and the auxiliary storage device 251. For example, the auxiliary storage device 251 can be a hard disk drive; and the memory sub-system 110 can be a solid state drive; and to generate the response 233 to the proof of space challenge 231, the solid state drive can send a first command to instruct the hard disk drive to read a first entry from a first lookup table of the remote plot 253, receive from the hard disk drive the first entry responsive to the first command, generate a second command according to the first entry, and send the second command to instruct the hard disk drive to read a second entry from the remote plot 253.

Thus, the memory sub-system 110 can generate the response 233 without assistance from the host system 120 connected to a host interface of the memory sub-system 110. Further, the proof of space challenge 231 can be received in the memory sub-system 110 via the network connection without assistance from the host system 120.

The memory sub-system 110 can also use a proof of space plot 209 stored in its spare storage space 223 to participate in proof of space activities in the cryptocurrency network 217.

For example, the memory sub-system 110 can be a solid state drive (SSD) has a communication interface (e.g., 237 or host interface 241) operable to receive commands from a host system 120. The SSD has memory cells formed on at least one integrated circuit die in memory devices (e.g., 130, 140) to store the plot 209 and/or other data (e.g., host data 207), and a processing device (e.g., 117 or controller 115) configured to control executions of the commands. The SSD can have firmware 201 configured to perform at least the method of FIG. 5.

The configuration data 203 can be further specified to control the other aspects of proof of space activities of the memory sub-system 110. In one embodiment, a method to control proof of space activities is implemented via operations performed by a proof of space manager 113 in a memory sub-system 110 of FIG. 1 and/or FIG. 2.

In general, the memory sub-system 110 having proof of space manager 113 receives configuration data 203 from a user of the memory sub-system 110.

For example, the memory sub-system 110 has a host interface configured to be coupled to a peripheral bus (e.g., a USB bus, a SATA bus, a PCI bus, a PCIe bus, etc.) to receive commands from a host system 120. The host system 120 can run an application to present a graphical user interface 213 for the user to specify the configuration data 203.

Alternatively, the proof of space manager 113 can function as a host of a network interface 215 and use the network interface 215 to establish a network connection to a user device. The user can use the user device to specify the configuration data 203 over the network connection.

Optionally, the memory sub-system 110 can have a transceiver operable to establish, under the control of the proof of space manager 113, a wired or wireless network connection to a computer network without assistance from the host system 120. The user can use a user device to specify the configuration data 203 over the network connection established using the transceiver of the memory sub-system 110.

The memory sub-system 110 can have a controller 115 that controls executions of commands to retrieve data from and store data to the data storage medium of the memory sub-system 110. The commands can be from the host system 120, or from the proof of space manager 113. For example, a processing device 117 of the controller 115 can execute firmware to implement the control. Optionally, the proof of space manager 113 is also implemented via firmware executed by the processing device 117. Alternatively, a separate, firmware interface is configured in the memory sub-system 110 to connect the proof of space manager 113 to the memory sub-system controller 115.

In one implementation, the memory sub-system 110 is a solid state drive (SSD); and the data storage medium includes the storage capacity 205 provided by memory cells formed on one or more integrated circuit dies of memory devices (e.g., 130, 140). In another implementation, the memory sub-system 110 is a hard disk drive (HDD).

The memory sub-system 110 stores the configuration data 203 in the memory sub-system 110 and controls operations of the proof of space manager 113 according to the configuration data 203.

For example, the configuration data 203 can specify whether the proof of space manager 113 is allowed to operate autonomously and independent from the host system 120, a limit or restriction on resources usable by the proof of space manager 113 to participate in proof of space activities, an identification of a type of proof of space activities the proof of space manager 113 is allowed to participate autonomously, a condition to allow the firmware to operate autonomously, or an account identification in the cryptocurrency network 217, or any combination thereof.

After the proof of space manager 113 detects a network connection, the memory sub-system 110 communicates, using the network connection without assistance from a host system 120 connected to a host interface of the memory sub-system 110, with a cryptocurrency network 217.

For example, under the control of the proof of space manager 113, the memory sub-system 110 can communicate with the cryptocurrency network 217 while the host system 120 is in a sleep/hibernation mode, or without the memory sub-system 110 being connected to a host system 120.

The proof of space manager 113 generates, independent of the host system 120, commands to operate on memory cells in the memory sub-system 110 in participation in proof of space activities in the cryptocurrency network 217.

For example, the proof of space manager 113 can generate write commands to store a plot 209 in the memory cells of a memory device 130 configured in the memory sub-system 110. The proof of space manager 113 can perform the computations to generate the plot 209, or receive the plot 209 over the network connection. The plot 209 includes a plurality of lookup tables usable to generate a response to a proof of space challenge.

For example, the proof of space manager 113 can generate read commands to use a plot 209 stored in the memory cells of a memory device 130 configured in the memory sub-system 110 to generate a response to a proof of space challenge.

Thus, the proof of space manager 113 can use the storage capacity 205 in an autonomous way to generate plots, store plots, and/or farm plots in an application of proof of space (e.g., in a cryptocurrency network 217), without using the resources of an external host system 120. The resources of the memory sub-system 110 used by the firmware 201 in the proof of space activities and/or cryptocurrency activities can be controlled by the configuration data 203 to avoid undesirable performance degradation in servicing the external host system 120.

A non-transitory computer storage medium can be used to store instructions of the firmware of a memory sub-system (e.g., 110). When the instructions are executed by the controller 115 and/or the processing device 117, the instructions cause the controller 115, the processing device 117, and/or a separate hardware module to perform the methods discussed above.

Figure 6:
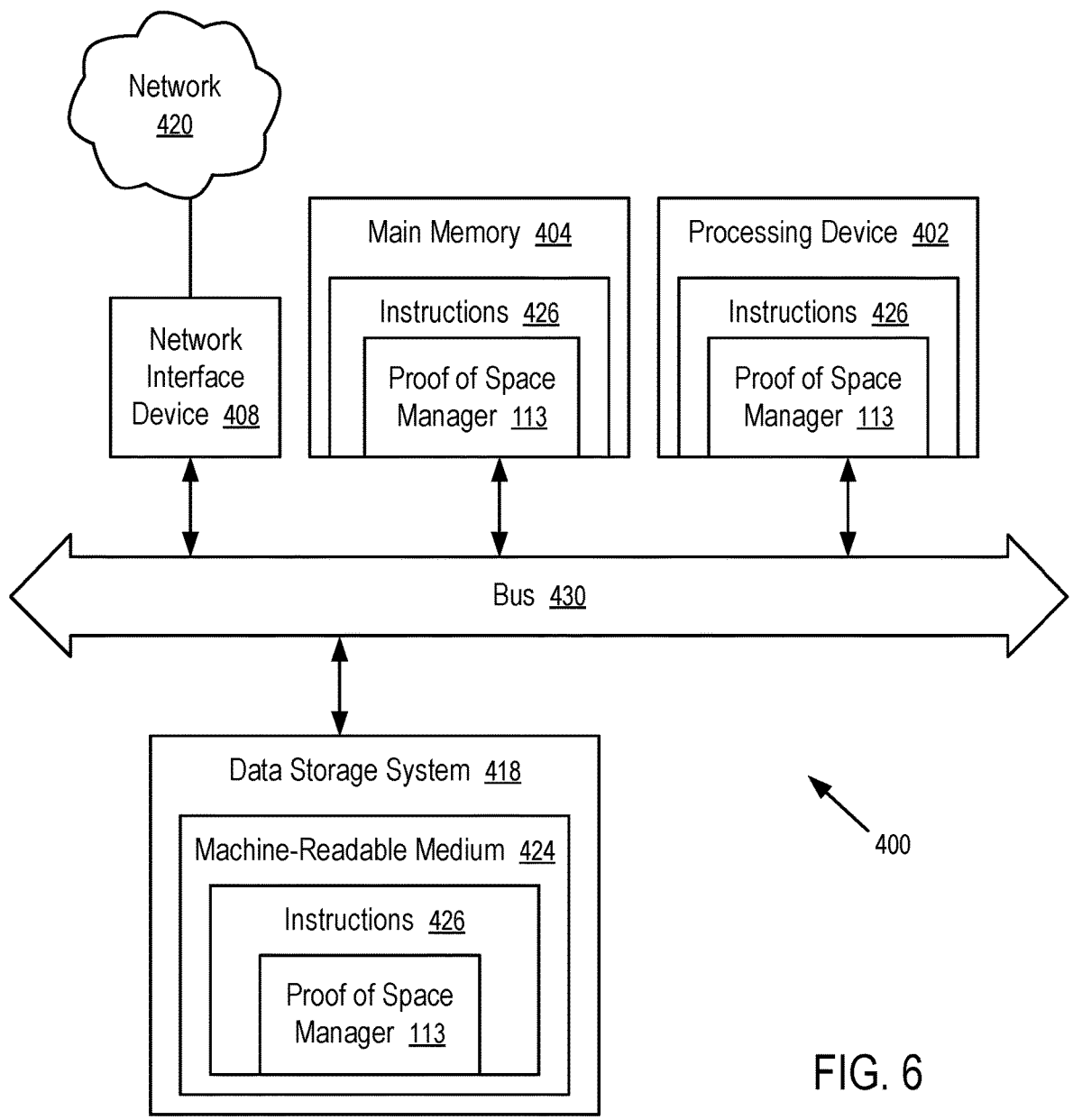
FIG. 6 is a block diagram of an example computer system in which embodiments of the present disclosure can operate.

FIG. 6 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory sub-system (e.g., the memory sub-system 110 of FIG. 1) or can be used to perform the operations of a proof of space manager 113 (e.g., to execute instructions to perform operations corresponding to the proof of space manager 113 described with reference to FIGS. 1-5). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 418, which communicate with each other via a bus 430 (which can include multiple buses).

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable medium 424, data storage system 418, and/or main memory 404 can correspond to the memory sub-system 110 of FIG. 1.

In one embodiment, the instructions 426 include instructions to implement functionality corresponding to a proof of space manager 113 (e.g., the proof of space manager 113 described with reference to FIGS. 1-5). While the machine-readable medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
    receiving, in a memory sub-system and via a user interface, configuration data indicative of a location, wherein the location identified via the configuration data is outside of the memory sub-system, and wherein the configuration data identifies a device storing a proof of space plot having a plurality of lookup tables at the location outside of the memory sub-system;
    storing, in the memory sub-system, the configuration data;
    receiving, in the memory sub-system, a proof of space challenge;
    communicating, by the memory sub-system, with the device identified by the configuration data to read the plurality of lookup tables according to the proof of space challenge;
    generating, by the memory sub-system, a response to the proof of space challenge based on entries looked up from the plurality of lookup tables stored in the device located outside of the memory sub-system; and
    transmitting, from the memory sub-system and responsive to receiving of the proof of space challenge, the response.

2. The method of claim 1, wherein the device is connected to the memory sub-system via a network connection; and the communicating with the device to generate the response includes:
    sending, via the network connection, the proof of space challenge to the device to cause the device to read the plurality of lookup tables and generate the response; and
    receiving, from the device, the response generated by the device.

3. The method of claim 2, further comprising:
receiving, in the user interface, a user input representative of a permission for the memory sub-system to use storage resources of the device to store data associated with proof of space activities, or a permission for the memory sub-system to use the proof of space plot in the device in responding to proof of space challenges, or any combination of permissions thereof.

4. The method of claim 3, wherein the entries are looked up from the plurality of lookup tables via:
reading a first entry of a first lookup table, among the plurality of lookup tables, according to the proof of space challenge; and
reading a second entry of a second lookup table, among the plurality of lookup tables, according to the first entry.

5. The method of claim 4, wherein the device, a host system, and the memory sub-system are connected to a peripheral bus; the response is generated during a time period in which the host system is in a low power mode, a sleep mode, or a hibernation mode; and the method further comprises:
sending a first command to instruct the device to read the first entry;
receiving, from the device, the first entry responsive to the first command;
generating a second command according to the first entry; and
sending the second command to instruct the device to read the second entry.

6. The method of claim 5, wherein the response is generated without assistance from the host system connected to a host interface of the memory sub-system; and the proof of space challenge is received in the memory sub-system via the network connection without assistance from the host system.

7. The method of claim 6, further comprising:
controlling, by the memory sub-system, the device and a network interface coupled to the peripheral bus via operating the memory sub-system as a host of the network interface and the device.

8. The method of claim 7, further comprising:
generating, by the memory sub-system, the proof of space plot in the memory sub-system; and
transferring the proof of space plot from the memory sub-system to the device.

9. The method of claim 2, wherein the memory sub-system is a first memory sub-system; the device includes a second memory sub-system storing the proof of space plot; and the second memory sub-system generates the response, in response to reception of the proof of space challenge from the first memory sub-system, without assistance from a host system of the device.

10. The method of claim 2, further comprising:
generating, by the memory sub-system, the proof of space plot in the memory sub- system; and
transferring the proof of space plot from the memory sub-system to the device.

11. The method of claim 2, further comprising:
generating, by the device, the proof of space plot;
storing, in the device, the proof of space plot; and
announcing, by the device in a network, availability of the proof of space plot to memory sub-systems in proof of space activities.

12. The method of claim 11, further comprising:
receiving, in the user interface, a user input to select the proof of space plot to generate the configuration data indicative of the location at which the proof of space plot is stored.

13. An apparatus, comprising:
a solid state drive, having:
a communication interface operable to receive commands from a host system;
memory cells formed on at least one integrated circuit die; and
a processing device configured to control executions of the commands;
wherein the solid state drive has firmware configured to:
receive, via a user interface, configuration data indicative of a location, outside of the solid state drive, storing a proof of space plot having a plurality of lookup tables;
store, in the solid state drive, the configuration data;
establish, from the solid state drive, a wired or wireless computer network connection;
receive, in the solid state drive via the network connection, a proof of space challenge;
communicate, by the solid state drive, with a device identified by the configuration data to read the plurality of lookup tables according to the proof of space challenge;
generate, by the solid state drive, a response to the proof of space challenge based on entries looked up from the plurality of lookup tables stored in the device located outside of the solid state drive; and
transmit, from the solid state drive via the network connection and responsive to receiving of the proof of space challenge, the response.

14. The apparatus of claim 13, wherein the solid state drive is further configured to via the firmware to:
send, via the network connection, the proof of space challenge to the device to cause the device to read the plurality of lookup tables and generate the response; and
receive, from the device, the response generated by the device.

15. The apparatus of claim 14, wherein the solid state drive is a first solid state drive; the device includes a second solid state drive storing the proof of space plot; and the second solid state drive generates the response, in response to reception of the proof of space challenge from the first solid state drive, without assistance from a host system of the device.

16. The apparatus of claim 14, wherein the device is configured to generate the proof of space plot and announce, in a network, availability of the proof of space plot to solid state drives in proof of space activities; and the solid state drive is further configured via the firmware to:
receive, via the user interface, a user input to select the proof of space plot to generate the configuration data indicative of the location at which the proof of space plot is stored.

17. A non-transitory computer readable storage medium storing instructions which, when executed in a solid state drive, causes the solid state drive to perform a method, comprising:
storing, in the solid state drive, configuration data specified via a user interface to indicate a location, outside of the solid state drive, storing a proof of space plot having a plurality of lookup table;

establishing, from the solid state drive, a wired or wireless computer network connection;

receiving, in the solid state drive via the network connection, a proof of space challenge;

communicating, by the solid state drive, with a device identified by the configuration data to read the plurality of lookup tables according to the proof of space challenge;

generating, by the solid state drive, a response to the proof of space challenge based on entries looked up from the plurality of lookup tables stored in the device located outside of the solid state drive; and transmitting, from the solid state drive via the network connection and responsive to receiving of the proof of space challenge, the response.

18. The non-transitory computer readable storage medium of claim 17, wherein the device, a host system, and the solid state drive are connected to a peripheral bus; the response is generated during a time period in which the host system is in a low power mode, a sleep mode, or a hibernation mode; and the method further comprises:

controlling, by the solid state drive, the device and a network interface coupled to the peripheral bus via operating the solid state drive as a host of the network interface and the device.

19. The non-transitory computer readable storage medium of claim 18, wherein the response is generated without assistance from the host system connected to a host interface of the solid state drive; and the proof of space challenge is received in the solid state drive via the network connection without assistance from the host system.

20. The non-transitory computer readable storage medium of claim 19, wherein the method further comprises:

generating, by the solid state drive, the proof of space plot in the solid state drive; and transferring the proof of space plot from the solid state drive to the device.

* * * * *